Aug. 1, 1961 C. G. LEONHARDT 2,994,332
APPARATUS FOR ULTRASONIC CLEANING
Filed April 11, 1958 2 Sheets-Sheet 2
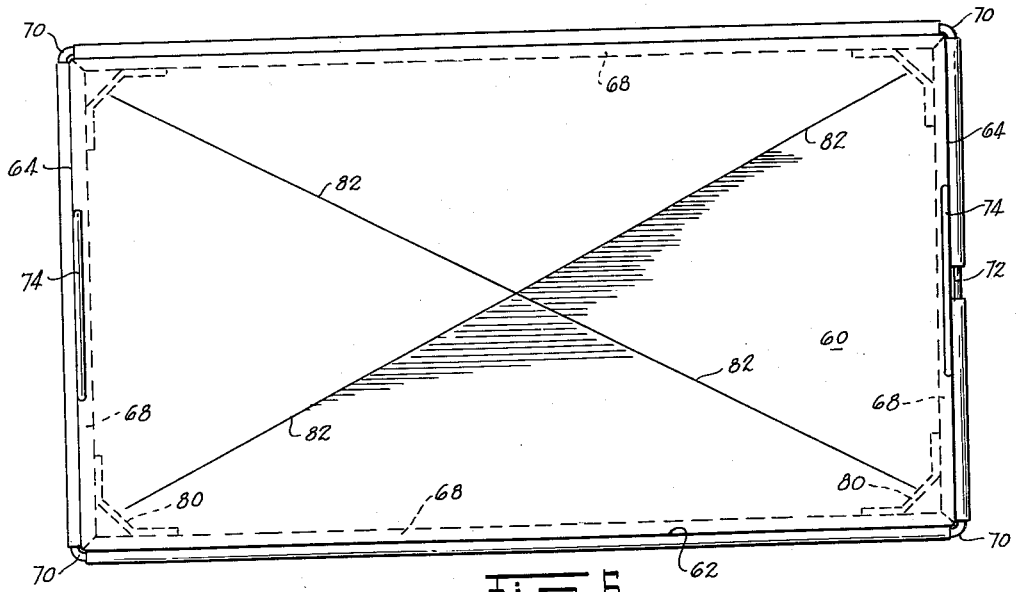
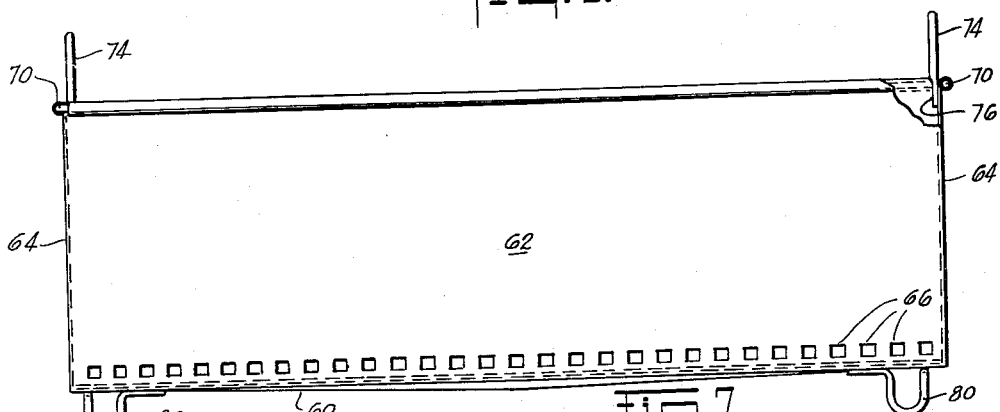
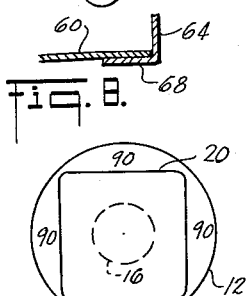
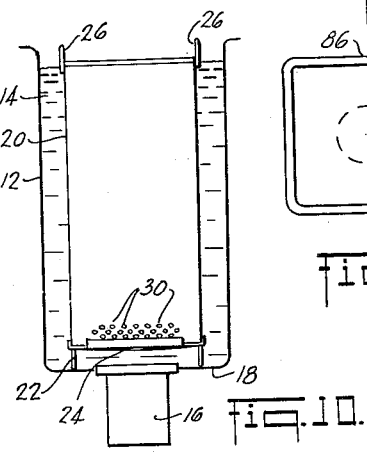
INVENTOR.
CHARLES G. LEONHARDT
BY *James and Franklin*
ATTORNEYS

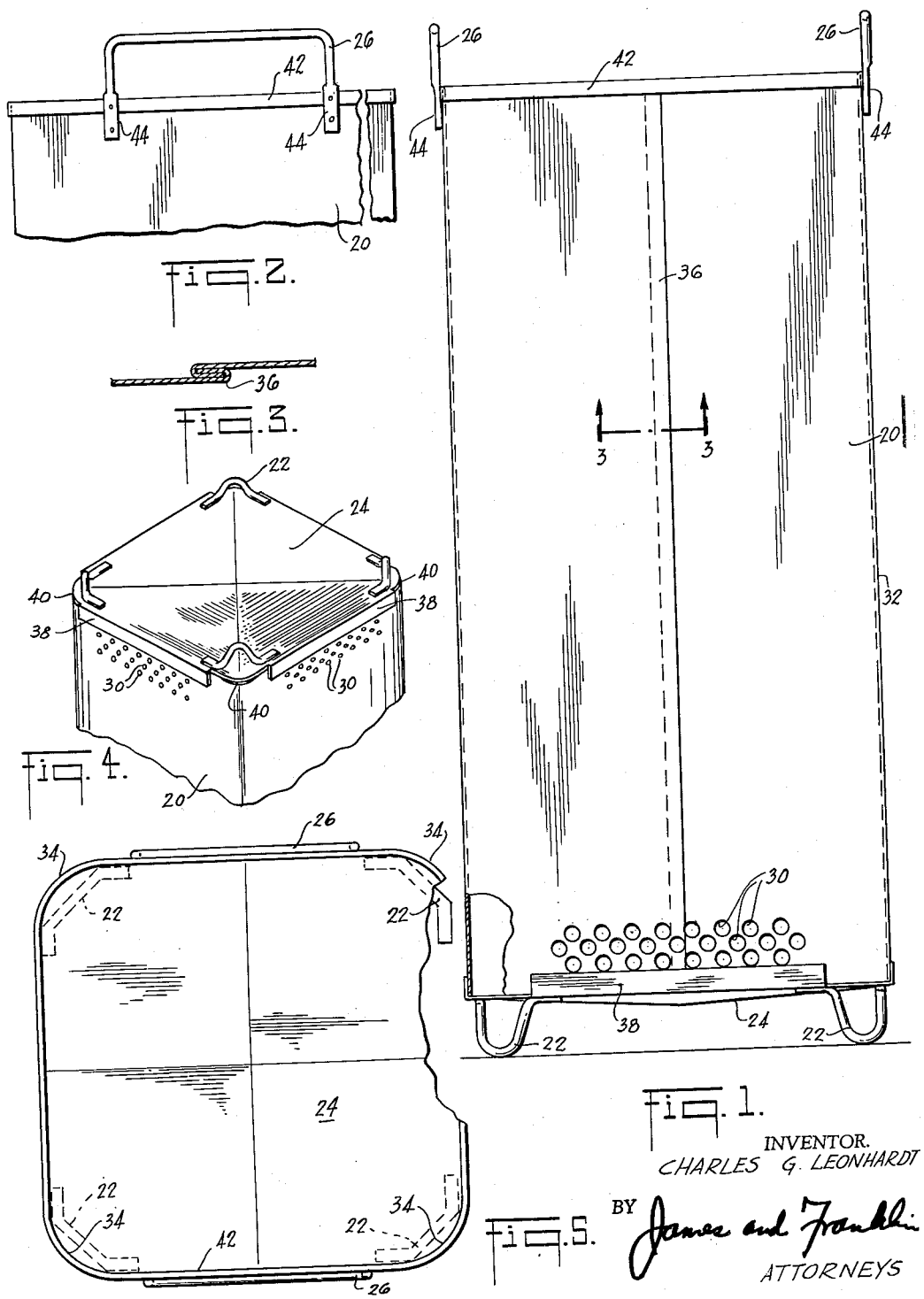

United States Patent Office 2,994,332
Patented Aug. 1, 1961

2,994,332
APPARATUS FOR ULTRASONIC CLEANING
Charles G. Leonhardt, Huntington, N.Y., assignor to Acoustica Associates, Inc., Mineola, N.Y., a corporation of New York
Filed Apr. 11, 1958, Ser. No. 727,982
3 Claims. (Cl. 134—184)

This invention relates to ultrasonic cleaning, and more particularly to a receptacle or so-called "basket" for the articles being cleaned.

The primary object of the invention is to generally improve apparatus for ultrasonic cleaning, and more particularly the basket which holds the articles to be cleaned. Such baskets have generally been made highly perforate, but I have found that for many if not most articles, a greater transparency to vibration may be obtained by making the basket imperforate. The theory underlying this change is explained later. However, drainage holes are provided for relatively rapid discharge of the liquid when removing the basket from the tank.

A further object of the present invention is to improve the cleaning efficiency and the co-operative relation between the basket and the tank when using an upright cylindrical tank having a single transducer at the bottom. Heretofore the practice has been to use a cylindrical basket when the tank is cylindrical, which seems logical and has the advantage of maximum volumetric capacity. However, I have found that greatly improved cleaning action is obtained by using a square basket even when the tank is cylindrical. The loss in volumetric capacity is more than offset by the improvement in cleaning.

To accomplish the foregoing general objects, and other more specific objects which will hereinafter appear, my invention resides in the improved basket, and its relation to the cleaning tank, as are hereinafter more particularly described in the following specification. The specification is accompanied by drawings in which:

FIG. 1 is a partially sectioned elevation of a basket embodying features of my invention;
FIG. 2 is a fragmentary view showing one of the handles;
FIG. 3 is a fragmentary section taken approximately in the plane of the line 3—3 of FIG. 1;
FIG. 4 is a perspective view of the bottom of the basket in inverted position;
FIG. 5 is a plan view of the basket;
FIG. 6 is a plan view of a modification;
FIG. 7 is an elevation of the basket shown in FIG. 6;
FIG. 8 is a fragmentary section showing a detail;
FIG. 9 is a simplified plan view showing relative configurations of the basket and tank;
FIG. 10 is a simplified vertical section through a basket and tank;
FIG. 11 is a view like FIG. 9, but showing a square basket in a square tank; and
FIG. 12 is a view like FIG. 9 but showing a rectangular basket in a rectangular tank.

Referring to the drawing, and more particularly to FIG. 10, the cleaner comprises an upright cylindrical tank 12 containing liquid indicated at 14. Appropriate detergent or cleaning solutions may be employed in the liquid. The liquid is vibrated at high frequency by means of an electroacoustic transducer 16 secured to the bottom 18 of the tank. The preferred frequency is ultrasonic, say 25 kc. or 40 kc.

The articles to be cleaned may be placed directly in the tank, but this is not convenient because they may be small, or difficult to handle as in the case of surgical instruments. The articles are therefore first loaded into a basket, which then is lowered into the tank, and later after the cleaning operation is bodily removed from the tank. Such a basket is indicated at 20, FIG. 10, and may be provided with feet 22 to elevate the bottom 24 of the basket somewhat above the bottom of the tank, and with handles 26 at the top of the tank.

The usual practice is to make the basket highly perforate. However, I have found that this may increase the opacity of the walls of the basket to transmission of vibration therethrough. If there were no limit to the size of the perforations the walls could be made highly transparent to vibration, and for this purpose it appears that the individual holes should be larger than the wave length of the vibration. With vibration at say 40 kc. the wave length is about one inch, and thus the holes should be larger than one inch. This, of course, would not hold small articles or surgical instruments, etc. and therefore small perforations or a relatively fine mesh has been employed. I find that the transparency may be improved by using imperforate side walls and bottom walls for the basket, and I find that for this purpose it is not essential that the wall be exceedingly thin. Indeed, in experimental work I have successfully used walls up to ⅛ inch in thickness, although for practical purposes the illustrated basket employs stainless steel sheet having a thickness of 0.019 inch.

However, it is desirable to provide quick filling of liquid in the basket when lowering the same, and rapid discharge of the liquid when lifting the basket out of the tank. For this purpose, a narrow band of drainage holes 30 is provided along the bottom edge of the side walls.

Considering the structure in greater detail and referring now to FIGS. 1-5 of the drawing, the basket 20 there shown is made up of a bottom wall 24 and side walls 32. The side walls all may be made of a single piece of sheet metal bent to provide four rounded corners, best shown at 34 in FIG. 5. The meeting edges may be joined by a hooked seam as shown at 36 in FIG. 3. The bottom wall 24 is square with rounded corners. It has its edges turned upwardly as indicated at 38. The flanges are spot welded to the side walls, thus assembling the two main parts of the basket. The flanges terminate short of the rounded corners, thus avoiding the need for a curved flange which would require a drawing operation. Moreover, by omitting the flanges at the corners 40, as is best shown in FIG. 4, additional drainage openings are provided because of the narrow gap or slit-like space between the bottom and the side walls at the four corners.

The band of drainage holes is shown at 30 in FIG. 1. This band may have a width of say one inch, in a basket which is eighteen inches high for use in a tank which may be say twenty inches high. The perforated band is a compromise between my desired solid wall, on the one hand, and the need for rapid drainage, on the other hand. Because of the flanges 38, the holes 30 are slightly elevated from the bottom, but the open corners 40 insure drainage to the bottom.

The top edge of the basket may be reinforced by reverse folding at 42, thereby rounding and thickening the top edge. The handles 26 may be formed of round rod which, however, is preliminarily flattened at the ends, as is indicated at 44, and these ends are secured to the basket, preferably by spot welding. The feet 22 similarly may be bent up out of round rod, and the ends flattened and spot welded to the bottom of the basket. The bottom 24 may be dropped or dished slightly at the center, as will be seen in FIG. 1, but this drop is small, say ⅛ inch for a basket fitting into a tank having a diameter of ten inches.

In larger units the cleaner may have a rectangular tank of considerable area, and in such case the basket is similarly proportioned. Such a tank may be energized by a plurality of transducers spaced along its bottom, and referring to FIG. 12, the rectangular tank 50 has transducers 52, 54, and 56 therebeneath. The tank receives a rectangular basket 58.

The construction of such a basket is shown in greater detail in FIGS. 6, 7 and 8 in the drawing. Referring to those figures, the basket comprises an imperforate bottom wall 60, substantially imperforate side walls 62, and substantially imperforate end walls 64. A narrow band 66 of drainage holes is provided along the bottom edge of the walls 62 and 64. These holes may be made rectangular or square instead of round, in order to increase the drainage area without widening the band. In the particular case here shown the holes are ¼ inch square, and the bottom of the drainage band is disposed immediately above the bottom 60 of the basket. The basket is somewhat more than ten inches wide and eighteen inches long.

To assemble the bottom and side walls, the bottom edges of the side walls are turned inwardly to form flanges indicated at 68 in FIGS. 6 and 8. These flanges support the bottom 60, as will be apparent in FIG. 8. The parts are welded.

The top edge of each side wall is curled outwardly and downwardly, preferably around a stiffening rod. This rod is exposed at the corners 70. The rod forms a rectangle with its ends meeting, as is indicated at 72 in FIG. 6. The handles 74 may be bent of round rod, and the ends may be flattened and welded to the basket, perferably on the inside of the basket, as shown at 76 in FIG. 7.

The basket may be and preferably is provided with feet 80, and here again these may be formed of round rod, the ends of which are flattened and welded to the bottom of the basket. The bottom 60 may be very slightly dished at the center, as is suggested by the lines 82 in FIG. 6.

As so far described, and referring to FIG. 11, a square basket 84 might be used in a square tank 86, the said tank having a transducer beneath its bottom at 88. Similarly, rectangle basket 58 may be used in a rectangular tank 50, as shown in FIG. 12. In accordance with prior practice a cylindrical tank as shown at 12 in FIGS. 9 and 10, would be provided with a cylindrical basket, but I have found that greatly improved cleaning action results when using a square basket 20 (FIG. 9) in a round tank 12, the transducer 16 being at the center of the bottom.

While I am not certain of the explanation for the improved result, it appears that there is an intense central vertical or axial core of cavitation when using a single transducer at the bottom of a cylindrical tank. It further appears that the use of a square instead of a cylindrical basket helps disperse the said intense axial core of cavitation, and thus provides a better overall cleaning effect throughout the basket. I find that the improvement in cleaning action more than compensates for any reduction in volumetric capacity of the basket. In this connection, it will be understood that the term "square" is used merely for convenience, and that in practice the corners may be somewhat rounded, as shown at 34 in FIG. 5. A small rounding, say one inch radius, greatly increases the capacity of the basket compared to one which is square with sharp corners.

The desired dispersion of the axial core of cavitation takes place in the square tank shown in FIG. 11, and there is no need to change the configuration of the basket relative to the configuration of the tank. Thus, from my own experimental work it appears that the improved operation does not depend on the presence of a free body of liquid around the basket, as shown in the areas marked 90 in FIG. 9.

The square holes shown in FIG. 7 may be used in the basket of FIG. 1, and vice versa. The bottom flange of FIG. 7, with drainage holes coming to the bottom, also may be used in the basket of FIG. 1.

It is believed that the construction and design of my improved basket, and its relation to the cleaning ta well as the advantages thereof, will be apparent the foregoing detailed description. It will also l parent that while I have shown and described n vention in several forms, changes may be made structure shown, without departing from the scope invention, as sought to be defined in the following c In the claims the reference to a square basket for a drical tank is not intended to exclude the use of ro corners, as shown in FIG. 5.

I claim:
1. In cleaning apparatus of the class wherein a right cylindrical tank has an electro-acoustic trans secured to the bottom of the tank for vibrating contained in the tank at an ultrasonic frequency wherein the articles to be cleaned are placed in a l for convenience in immersing the dirty articles anc sequently removing the cleaned articles from the the combination with said cylindrical tank of a l having an imperforate square bottom wall and fou tangular side walls which are imperforate except narrow band of drainage holes along the bottom of the side walls, said basket being dimensioned received in the cylindrical tank.

2. In cleaning apparatus of the class wherein a right cylindrical tank has an electro-acoustic trans secured to the bottom of the tank for vibrating contained in the tank at an ultrasonic frequency wherein the articles to be cleaned are placed in a l for convenience in immersing the dirty articles anc sequently removing the cleaned articles from the the combination with said cylindrical tank of a l having a square bottom wall and four rectangulai walls which are imperforate except for a narrow of drainage holes near the bottom peripheral corner basket being dimensioned to be received in the cylin tank, and having feet at the bottom of the bask elevate the same somewhat above the bottom of the and having handles at the top of the basket for rer or insertion of the basket in the tank.

3. In cleaning apparatus of the class wherein a right cylindrical tank has an electro-acoustic trans secured to the bottom of the tank for vibrating l contained in the tank at an ultrasonic frequency wherein the articles to be cleaned are placed in a l for convenience in immersing the dirty articles and sequently removing the cleaned articles from the the combination with said cylindrical tank of a t having an imperforate square bottom wall and rectangular side walls which are imperforate excep a narrow band of drainage holes along the bottom of the side walls, said basket being dimensioned received in the cylindrical tank, and having feet a bottom of the basket to elevate the same somewhat the bottom of the tank, and having handles at the of the basket for removal or insertion of the basket i tank.

References Cited in the file of this patent
UNITED STATES PATENTS

| 386,540 | Holden | July 24, |
| 571,017 | Reeve | Nov. 10, |
| 1,207,279 | Crum | Dec. 5, |
| 1,734,975 | Loomis | Nov. 12, |
| 2,201,685 | Lorenzen | May 21, |
| 2,468,550 | Fruth | Apr. 26, |
| 2,495,295 | Spanier | Jan. 24, |
| 2,527,178 | Elsaesser | Oct. 24, |
| 2,616,820 | Bourgeaux | Nov. 4, |
| 2,702,260 | Massa | Feb. 15, |
| 2,860,646 | Zucker | Nov. 18, |

FOREIGN PATENTS

| 327,688 | Switzerland | Mar. 21, |